(12) United States Patent
Iwasaki et al.

(10) Patent No.: US 11,029,189 B2
(45) Date of Patent: Jun. 8, 2021

(54) LIQUID SURFACE DETECTING APPARATUS AND LIQUID SURFACE DETECTING METHOD USING REFLECTED LIGHT

(71) Applicants: KAWASAKI JUKOGYO KABUSHIKI KAISHA, Kobe (JP); SYSMEX CORPORATION, Kobe (JP)

(72) Inventors: Yukio Iwasaki, Kobe (JP); Satoshi Ouchi, Kobe (JP); Eiji Mitsui, Kobe (JP); Junichi Matsuoka, Kobe (JP); Takehiro Hasegawa, Kobe (JP)

(73) Assignees: SYSMEX CORPORATION, Kobe (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 250 days.

(21) Appl. No.: 16/226,757

(22) Filed: Dec. 20, 2018

(65) Prior Publication Data
US 2019/0195675 A1 Jun. 27, 2019

(30) Foreign Application Priority Data
Dec. 26, 2017 (JP) .............................. JP2017-250246

(51) Int. Cl.
| | |
|---|---|
| *G01F 23/292* | (2006.01) |
| *G01N 35/10* | (2006.01) |
| *G01N 35/00* | (2006.01) |
| *G06T 7/62* | (2017.01) |
| *G06T 7/00* | (2017.01) |

(52) U.S. Cl.
CPC ...... *G01F 23/292* (2013.01); *G01N 35/00584* (2013.01); *G01N 35/1009* (2013.01); *G06T 7/0006* (2013.01); *G06T 7/62* (2017.01); *G01N 2035/1025* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 5,361,758 | A * | 11/1994 | Hall .................... | A61B 5/14532 600/322 |
| 6,365,106 | B1 * | 4/2002 | Nagai ................ | G01N 15/1404 356/246 |

(Continued)

FOREIGN PATENT DOCUMENTS

JP 2010-038659 A 2/2010

*Primary Examiner* — Brandi N Hopkins
*Assistant Examiner* — Nigel H Plumb
(74) *Attorney, Agent, or Firm* — Metrolex IP Law Group, PLLC

(57) ABSTRACT

A liquid surface detecting apparatus including: a retaining section that retains liquid as sample or reagent; a light emitter that emits light toward the liquid retained in the retaining section; an image capturing device that captures an image of the liquid retained in the retaining section; and a detecting device that detects a level of a liquid surface of the liquid retained in the retaining section based on the image of the liquid captured by the image capturing device, wherein the image capturing device is provided at a position such that the light, emitted by the light emitter and reflected by the liquid surface of the liquid, directly enters the image capturing device.

10 Claims, 8 Drawing Sheets

(56) References Cited

U.S. PATENT DOCUMENTS

| | | | | |
|---|---|---|---|---|
| 7,581,442 B1* | 9/2009 | Dietz | ............. | G01F 23/2924 |
| | | | | 73/293 |
| 7,628,956 B2* | 12/2009 | Jindo | ............. | F04B 11/0075 |
| | | | | 324/71.4 |
| 8,920,724 B2* | 12/2014 | Nagai | ............. | G01N 1/30 |
| | | | | 422/68.1 |
| 2008/0305012 A1* | 12/2008 | Camenisch | ............. | G01N 35/1016 |
| | | | | 422/400 |
| 2011/0026015 A1* | 2/2011 | Mimeault | ............. | G01S 17/88 |
| | | | | 356/139.1 |
| 2013/0343620 A1* | 12/2013 | Okuda | ............. | G06T 7/0012 |
| | | | | 382/128 |
| 2014/0064019 A1* | 3/2014 | Hamada | ............. | B01F 11/0017 |
| | | | | 366/213 |
| 2014/0295450 A1* | 10/2014 | Morita | ............. | G01N 35/00 |
| | | | | 435/6.14 |
| 2015/0093754 A1* | 4/2015 | Asao | ............. | B01L 9/543 |
| | | | | 435/6.12 |
| 2015/0250113 A1* | 9/2015 | Shoham | ............. | A01G 33/00 |
| | | | | 47/62 R |
| 2016/0011221 A1* | 1/2016 | Hegedus | ............. | G01N 35/00029 |
| | | | | 435/286.3 |

* cited by examiner

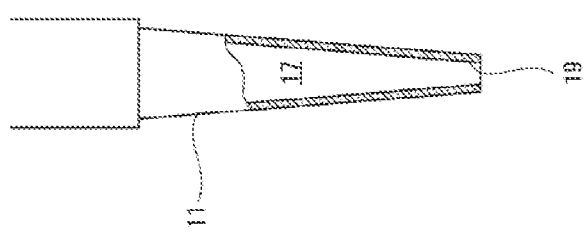
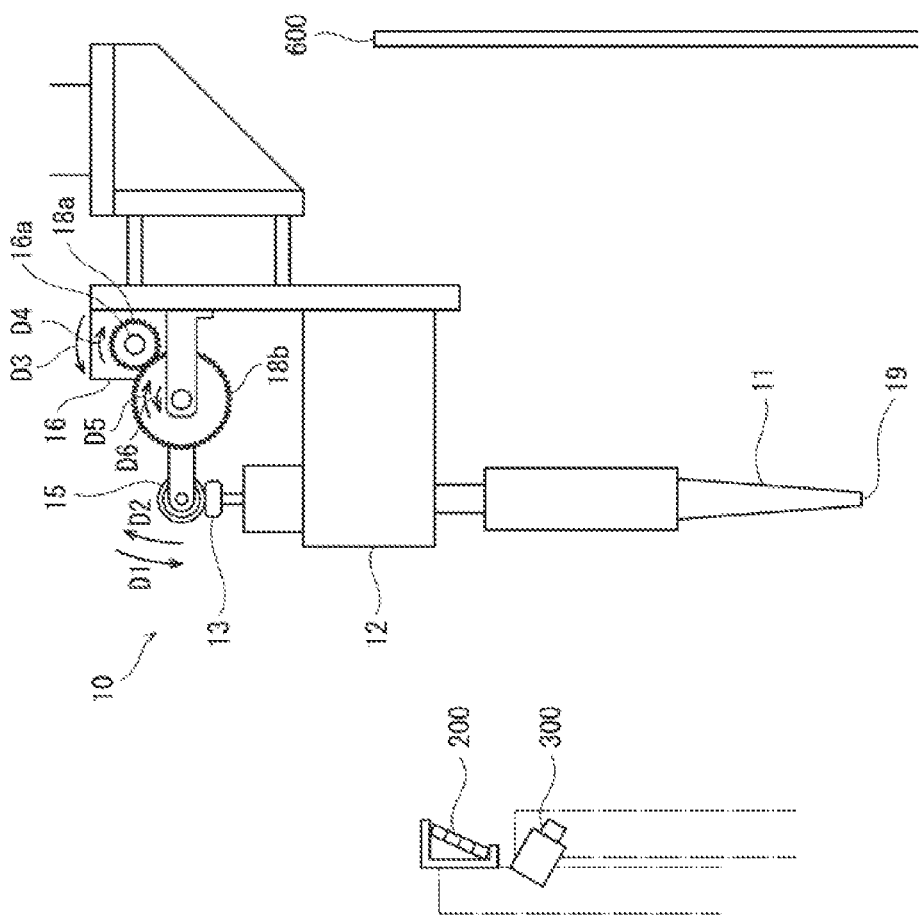
FIG. 2B
FIG. 2A

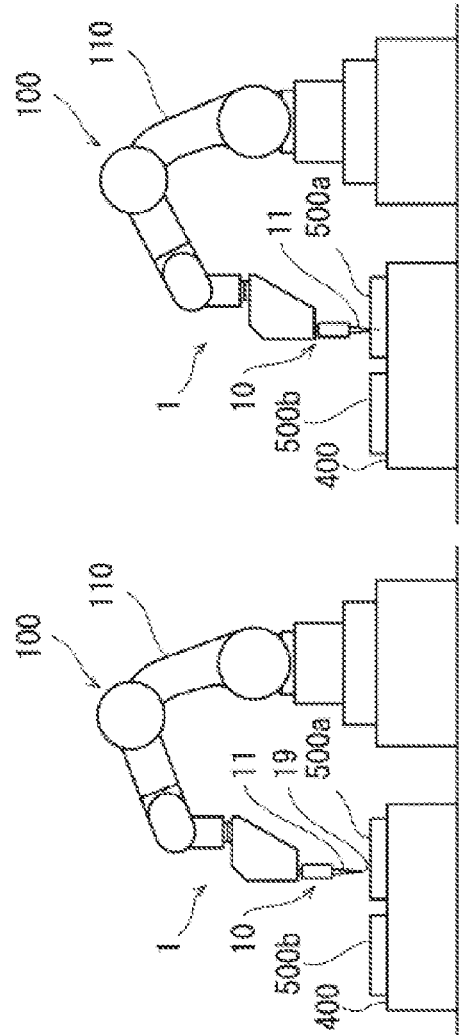
FIG. 8A
FIG. 8B
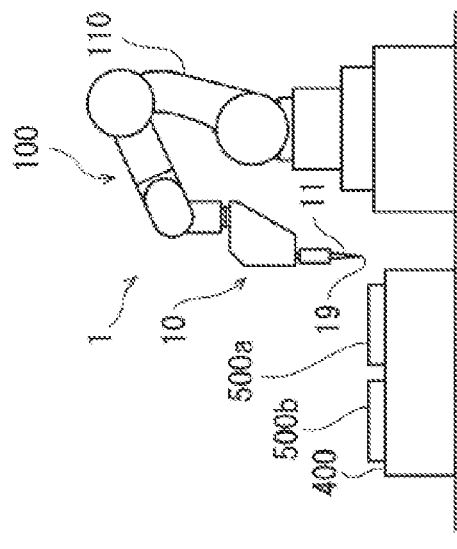
FIG. 8C
FIG. 8D
FIG. 8E
FIG. 8F

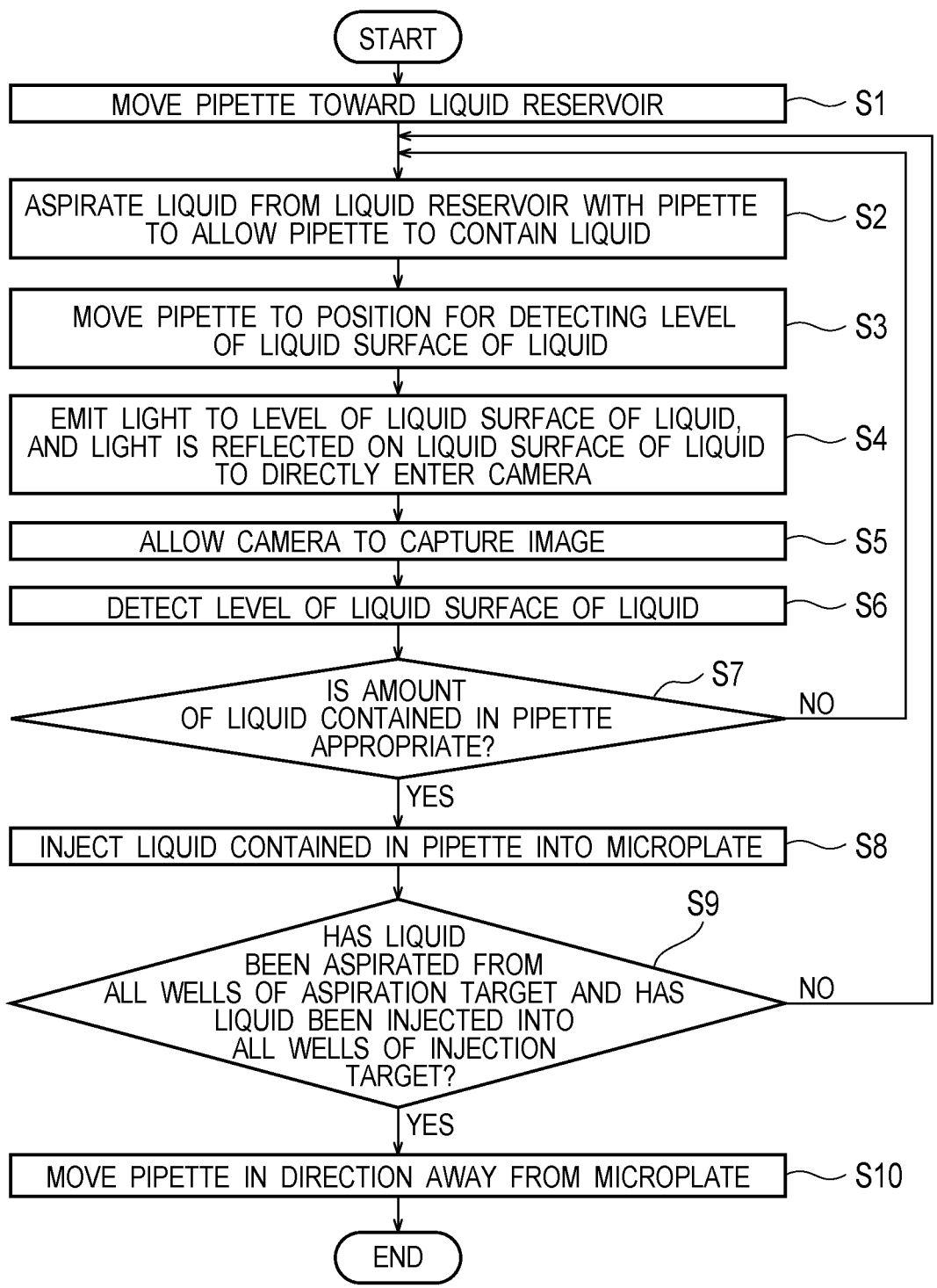

LIQUID SURFACE DETECTING APPARATUS AND LIQUID SURFACE DETECTING METHOD USING REFLECTED LIGHT

CROSS REFERENCE TO RELATED APPLICATION

This application claims priority based on 35 USC 119 from prior Japanese Patent Application No. 2017-250246 filed on Dec. 26, 2017, entitled "LIQUID SURFACE DETECTING APPARATUS AND LIQUID SURFACE DETECTING METHOD", the entire contents of which are incorporated herein by reference.

BACKGROUND

The disclosure relates to a liquid surface detecting apparatus and a liquid surface detecting method which detect a level of a liquid surface.

Conventionally, apparatuses have been proposed which collect liquid, a sample or a reagent, in a container and detect the level of the liquid surface of the liquid inside the container. For example, an apparatus disclosed in Japanese Patent Application Publication No. 2010-38659 ("Patent Literature 1") is among them. In Patent Literature 1, LEDs (light emitting diodes) irradiate a container with white light, and an image of the container irradiated with white light is captured by a camera. The captured image is analyzed by image processing, and the level of the liquid surface inside the container is detected using the image.

In the apparatus disclosed in Patent Literature 1, the positional relationship between the container and the camera is adjusted such that the reflected light reflected by the liquid surface does not directly enter the camera. This prevents what is called blown out highlights due to overexposure.

However, since the reflected light does not directly enter the camera, there is a possibility in some cases that the light amount of the reflected light entering the camera may be insufficient. In particular, if the liquid is blood and there is a clear layer of plasma on the top of the liquid, it may be difficult to detect the level of the liquid surface of the clear layer using an image. Therefore, when there is a clear layer or a transparent layer on the upper surface of the liquid, there is a possibility that the level of the liquid surface cannot be detected accurately.

In light of the above circumstances, the disclosure aims to provide a liquid surface detecting apparatus and a liquid surface detecting method which can detect the level of a liquid surface more reliable.

SUMMARY

In accordance with one or more embodiments, a liquid surface detecting apparatus includes a retaining section that retains liquid as sample or reagent; a light emitter that emits light toward the liquid retained in the retaining section; an image capturing device that captures an image of the liquid retained in the retaining section; and a detecting device that detects a level of a liquid surface of the liquid retained in the retaining section based on the image of the liquid captured by the image capturing device, wherein the image capturing device is provided at a position such that the light, emitted by the light emitter and reflected by the liquid surface of the liquid, directly enters the image capturing device.

In accordance with one or more embodiments, a method of detecting a liquid surface includes: emitting light toward the liquid as sample or reagent retained in a retaining section; capturing an image of the liquid at a position such that the light, emitted in the light emission and reflected by a liquid surface of the liquid, directly enters the image capturing device; and detecting a level of the liquid surface of the liquid based on the image of the liquid captured in the image capturing.

BRIEF DESCRIPTION OF DRAWINGS

FIG. 2A is a diagram illustrating a side view of a hand section of a robot main body section in a liquid surface detecting apparatus, such as in FIG. 1, and FIG. 2B is a diagram illustrating a partial cross-sectional view of a pipette gripped by the hand section;

FIGS. 8A to 8F are configurational diagrams illustrating various steps in which a liquid surface detecting apparatus, such as in FIG. 1, detects the level of the liquid surface of the liquid inside a pipette and the liquid surface detecting apparatus injects the liquid into a microplate; and FIG. 9 is a flowchart illustrating a flow of a liquid surface detecting apparatus, such as in FIG. 1, detecting the level of the liquid surface of the liquid inside a pipette.

DETAILED DESCRIPTION

Figure 1:
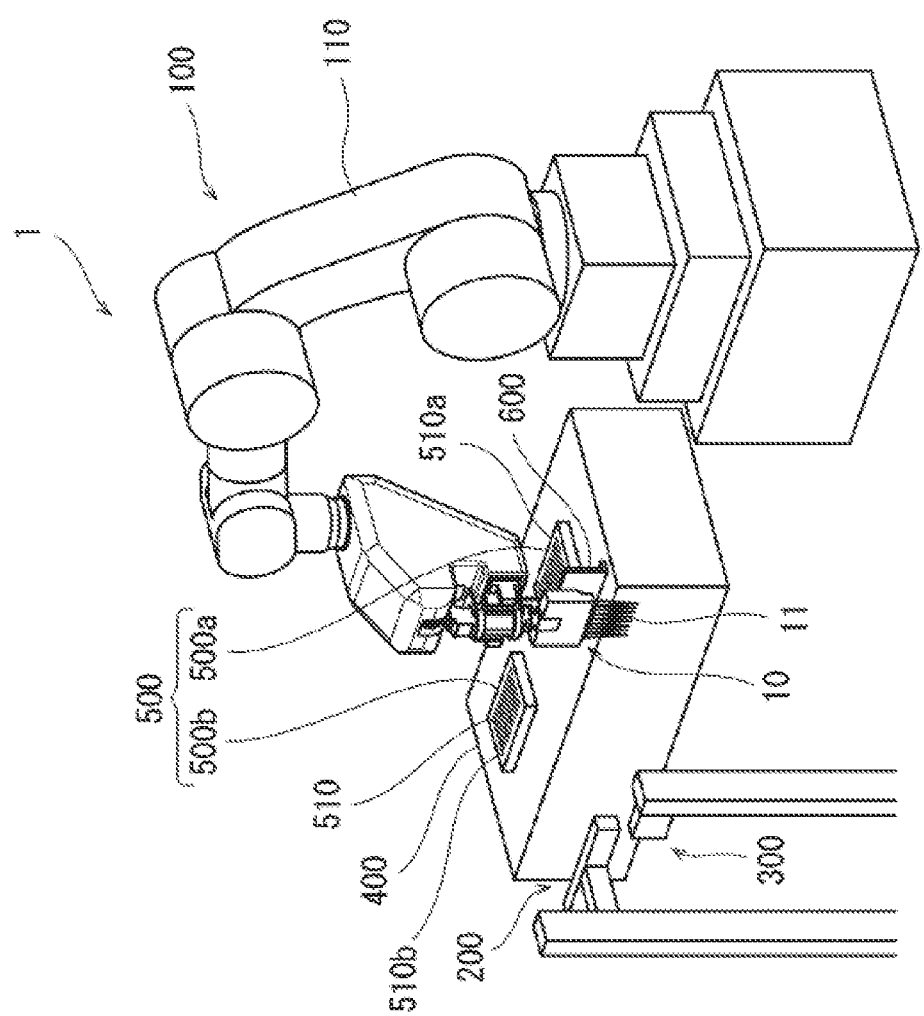
FIG. 1 is a diagram illustrating a perspective view of a liquid surface detecting apparatus according to one or more embodiments of the disclosure.

Embodiments are explained with referring to drawings. In the respective drawings referenced herein, the same constitutions are designated by the same reference numerals and duplicate explanation concerning the same constitutions is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratio are different from one drawing to another.

Hereinafter, a description is provided for a liquid surface detecting apparatus and a liquid surface detecting method according to one or more embodiments of the disclosure with reference to the accompanying drawings.

FIG. 1 is a perspective view of a liquid surface detecting apparatus 1 according to one or more embodiments of the disclosure.

The liquid surface detecting apparatus 1 includes a main body section 100, a light emitter 200, a camera (image capturing device) 300, and a table 400.

The table 400 has two microplates 500 placed thereon. Each of the microplates 500 has multiple wells 510 formed therein as holes capable of retaining liquid as sample or reagent. As for the number of wells 510 in this embodiment, twelve (12) wells are arranged along the longitudinal side direction and eight (8) wells along the short side direction of the microplate 500, and a total of 96 wells 510 are formed in one microplate 500.

In addition, the table 400 has a light shielding member 600 placed thereon.

The light emitter 200 is configured such that it can emit light. In the present embodiment, the light emitter 200 is configured such that it can emit red light.

The camera 300 is configured such that it can capture an image as an image capturing device. The camera 300 is configured such that it can capture an image of the level of the liquid surface of the liquid when an appropriate amount of liquid is retained inside the pipette gripped by the main body section 100.

In the present embodiment, the main body section 100 is used as a multi-axial industrial robot. The main body section 100 used in the present embodiment includes a robot arm 110. In addition, the main body section 100 includes a hand section 10 at the distal end thereof. The main body section 100 further includes a robot controller 14.

FIGS. 2A and 2B illustrate the hand section 10 of the main body section 100. FIG. 2A illustrates a side view of the hand section 10, and FIG. 2B illustrates a partial cross-sectional view of a partially broken pipette 11 gripped by the hand section 10.

The hand section 10 grips multiple pipettes (aspirators) 11. In the present embodiment, the hand section 10 grips eight pipettes 11. The eight pipettes 11 are arranged in a line and gripped by the hand section 10. In the present embodiment, the pipettes 11 are configured such that they are allowed to aspirate and retain liquid as a medical instrument. The pipettes 11 are made of a transparent material and are configured to allow light emitted from the light emitter 200 to pass therethrough.

A gripping section 12 gripping the pipettes 11 includes a pin 13. In addition, formed in the distal end portion of the pipette 11 is an opening portion 19 which is capable of taking liquid into the pipette 11 and ejecting the liquid retained inside to the outside of the pipette 11. In addition, the pipette 11 includes a liquid retaining section 17 which is capable of temporarily retaining liquid aspirated via the opening portion 19.

It is possible to eject the liquid retained inside the pipette 11 to the outside of the pipette 11 via the opening portion 19 by pressing down the pin 13 at an upper position. On the other hand, it is possible to form a negative pressure inside the pipette 11 by moving up the downpressed pin 13. If the opening portion 19 is located in the liquid and then the pin 13 is moved up, it is possible to take the liquid into the pipette 11 via the opening portion 19.

In the present embodiment, it is possible to move down the pin 13 by moving a lever 15 in a direction D1 illustrated in FIG. 2. In addition, it is possible to move up the pin 13 by moving the lever 15 in a direction D2 illustrated in FIG. 2.

In addition, in the present embodiment, the hand section 10 includes a motor 16 which is driven for the purpose of moving the lever 15 in the direction D1 or the direction D2. When a shaft 16a of the motor 16 is rotationally driven, the driving force is transmitted via a gear 18a and a gear 18b to the lever 15 fixedly connected to the gear 18b.

When the shaft 16a is driven in a direction D3, the gear 18b moves in a direction D5 and the lever 15 moves in the direction D2. As a result, if the pin 13 is in a downpressed position, the pin 13 moves up when the motor 16 is driven.

On the other hand, when the shaft 16a is driven in a direction D4, the gear 18b moves in a direction D6 and the lever 15 moves in the direction D1. As a result, if the pin 13 is at an upper position, the pin 13 moves and is pressed down when the motor 16 is driven.

Figure 3A:
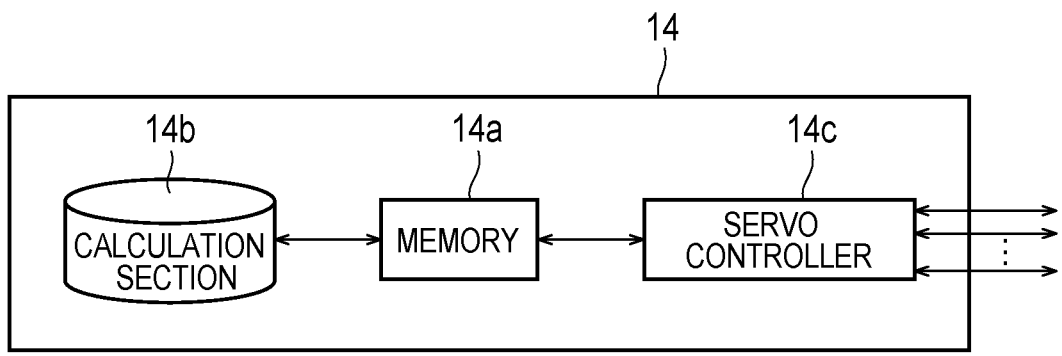
FIG. 3A is a block diagram illustrating a configuration of a control system of a robot main body section in a liquid surface detecting apparatus, such as in FIG. 1.

Next, a description is provided for the control configuration of the main body section 100. FIG. 3A illustrates a block diagram of the control configuration in the main body section 100.

As illustrated in FIG. 3A, the robot controller 14 in the main body section 100 includes a calculation section 14a, a memory 14b, and a servo controller 14c.

The robot controller 14 is a robot controller which includes a computer such as a microcontroller. Note that the robot controller 14 may be a single robot controller 14 for centralized control or may be multiple robot controllers 14 which cooperate for distributed control.

The memory 14b has information such as a basic program as a robot controller and various types of fixed data recorded therein. The calculation section 14a controls various operations of the main body section 100 by reading and executing software such as the basic program recorded in the memory 14b. Specifically, the calculation section 14a generates a control command for the main body section 100 and outputs it to the servo controller 14c. For example, the calculation section 14a is a processor unit.

The servo controller 14c is configured to control the drive of the servo motors corresponding to the respective joints of the robot arm 110 in the main body section 100 based on the control command generated by the calculation section 14a.

Figure 3B:
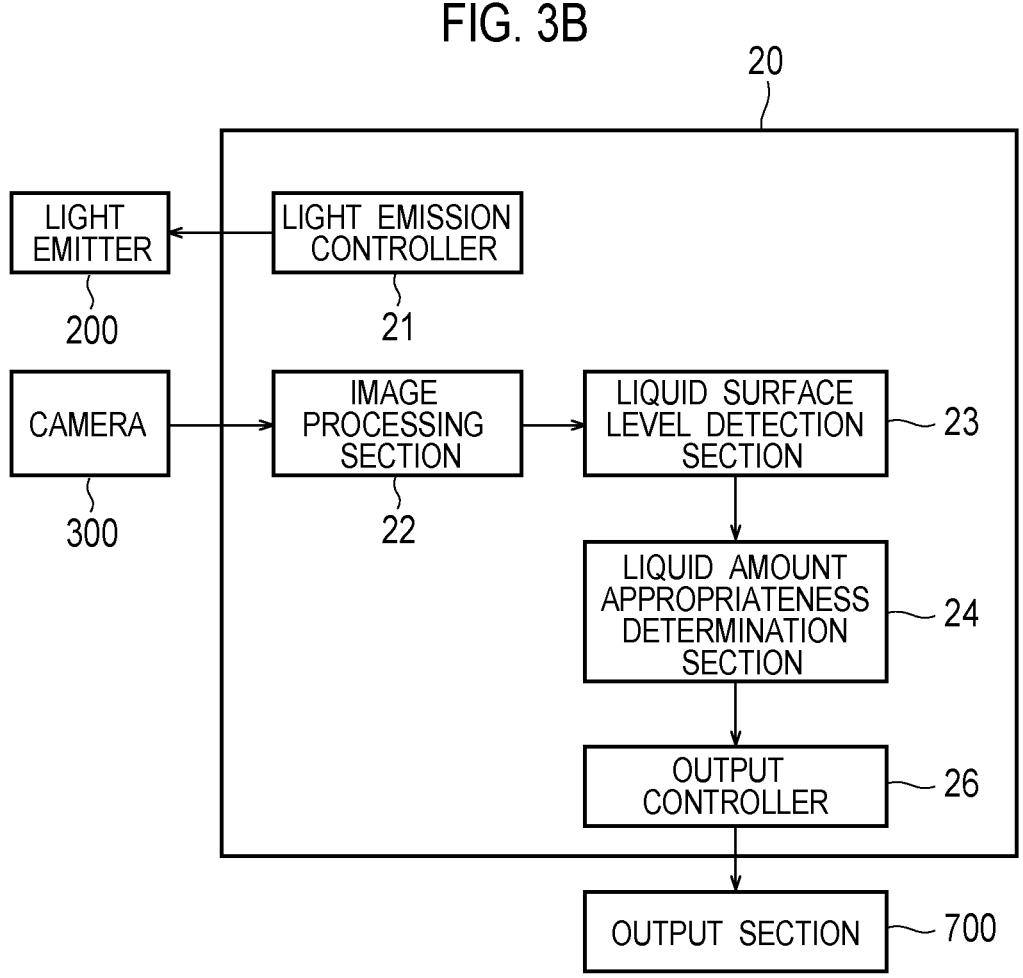
FIG. 3B is a block diagram illustrating a configuration of a control system of a liquid surface detector in the liquid surface detecting apparatus.

FIGS. 3A and 3B illustrate a block diagram of the control configuration the liquid surface detecting apparatus 1 when the liquid surface detecting apparatus 1 detects the liquid surface inside the pipette 11.

The liquid surface detecting apparatus 1 includes a liquid surface detection controller 20 as a controller having a configuration to detect the liquid surface inside the pipette 11. The liquid surface detection controller 20 includes a light emission controller 21 which controls the emission of light from the light emitter 200. The light emission controller 21 controls, for example, ON and OFF of light emission by the light emitter 200. The light emitter 200 emits light based on a command from the light emission controller 21. In addition, the liquid surface detection controller 20 includes an image processing section 22 which performs image processing based on the image data captured by the camera 300, a liquid surface level detection section 23 which detects the level of the liquid surface based on the image data for which image processing has been performed by the image processing section 22, a liquid amount appropriateness determination section 24 which detects whether or not the amount of liquid inside the pipette 11 is appropriate based on the level of the liquid surface detected by the liquid surface level detection section 23, and an output controller 25 which controls the output to an output section 700 of the results of the determination by the liquid amount appropriateness determination section 24 as to whether or not the liquid amount is appropriate.

The camera 300 captures an image of the light which is emitted by the light emitter 200 and which is reflected by the liquid surface of the liquid inside the pipette 11. Then, the image processing section 22 performs image processing on the image data of the light captured by the camera 300. The liquid surface level detection section 23 detects the level of the liquid surface based on the position of a region which is recognized as the position of the liquid surface of the liquid inside the pipette 11 on the image data for which image processing has been performed by the image processing section 22. The liquid amount appropriateness determination section 24 detects whether or not the level of the liquid surface detected by the liquid surface level detection section 23 is within a predetermined range, and the liquid amount appropriateness determination section 24 determines that the amount of liquid is appropriate if the level of the liquid surface is within the predetermined range and determines that the amount of liquid is inappropriate if the level of the liquid surface is not within the predetermined range. The output controller 25 controls, for example, the output of the determination result by the liquid amount appropriateness determination section 24 to the output section 700 as a display (display section).

Note that, in the present embodiment, although the description is provided for an embodiment where the output section 700 is a display, the output section 700 is not limited to a display. The output section 700 may be an output device other than a display. For example, the output section 700 may be a printing section or may be an embodiment where the output results are printed on a sheet of paper by the printing section. In this case, the output controller 25 may be a controller which controls the output to the printing section. Furthermore, the output section 700 may be an output device of another form.

Figure 4A:
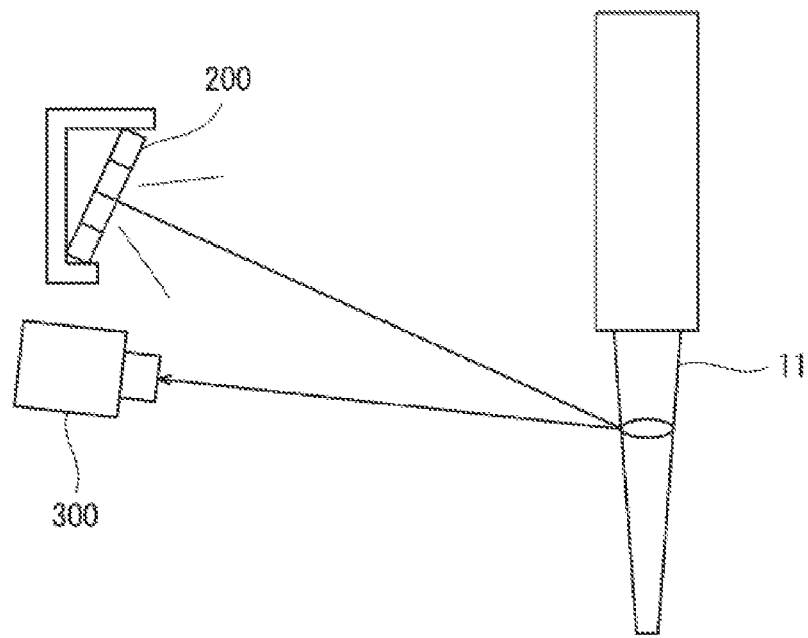
FIG. 4A is a configurational diagram illustrating light path emitted from a light emitter and entering a camera in the detection of the level of the liquid surface of liquid retained inside a pipette in a liquid surface detecting apparatus, such as in FIG. 1.
Figure 4B:
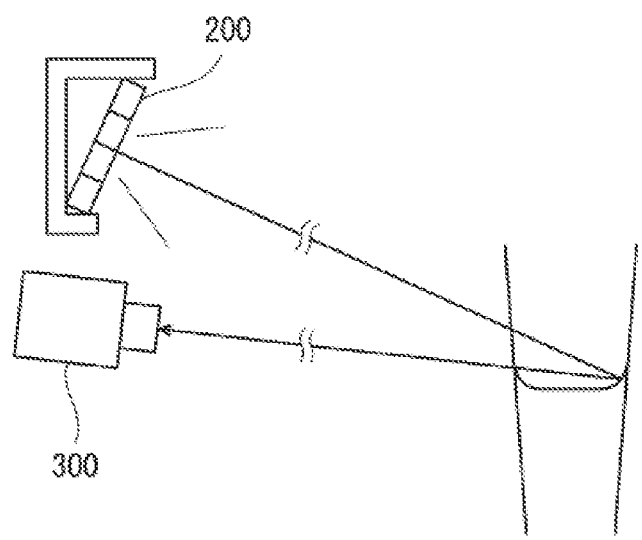
FIG. 4B is a configurational diagram illustrating an enlarged liquid surface of the liquid inside the pipette.

FIGS. 4A and 4B illustrate the positional relationship between the light emitter 200, the camera 300, and the pipette 11. FIG. 4A is a configurational diagram for light emitted from the light emitter 200 and entering the camera 300 in the detection of the level of the liquid surface of liquid retained inside the pipette 11. FIG. 4B is a configurational diagram for an enlarged liquid surface of the liquid inside the pipette 11, illustrating light emitted from the light emitter 200 and entering the camera 300.

As illustrated in FIG. 4A, the light emitted from the light emitter 200 is reflected by the liquid surface of the liquid retained inside the pipette 11 and directly enters the camera 300. The camera 300 captures an image while the light, emitted from the light emitter 200 and reflected by the liquid surface in this way, is directly entering the camera 300. As a result, intense light enters the camera 300 from the position of the liquid surface, whereby an image is captured.

Note that the liquid surface of the liquid inside the pipette 11 is curved due to surface tension. As illustrated in FIG. 4B, the positional relationship between the light emitter 200, the camera 300, and the pipette 11 may be such that the light emitted from the light emitter 200 is reflected by the curved portion of the liquid surface and the reflected light directly enters the camera 300. In other words, the camera 300 may be provided at a position such that the light emitted by the light emitter 200 and reflected by the curved portion of the liquid surface of the liquid directly enters the camera 300.

As described above, the camera 300 is provided at a position such that the light emitted by the light emitter 200 and reflected by the liquid surface of the liquid directly enters the camera 300. Specifically, the camera 300 is provided on the optical axis of the light emitted by the light emitter 200 and specularly reflected by the liquid surface of the liquid. Since the light specularly reflected by the liquid surface enters the camera 300, the light emitted by the light emitter 200 efficiently enters the image capturing device. As a result, it is possible to allow more intense light to enter the camera 300.

Since the camera 300 captures an image while the intense light reflected by the liquid surface is entering the camera 300, an image is captured while the intense light from the liquid surface of the liquid is entering the camera 300. In the captured image, the light from the liquid surface of the liquid inside the pipette 11 is intense. Thus, the corresponding area is brightly displayed because the luminance at that area is high. In the present embodiment, the light reflected by a portion of the liquid surface of the liquid directly enters the camera 300. Then, the camera 300 captures an image while intense light producing local blown out highlights enters the camera 300. Since the liquid surface of the liquid is intensely illuminated by direct light, the liquid surface is clearly displayed on the captured image, making it possible to reliably recognize the level of the liquid surface.

Figure 5:
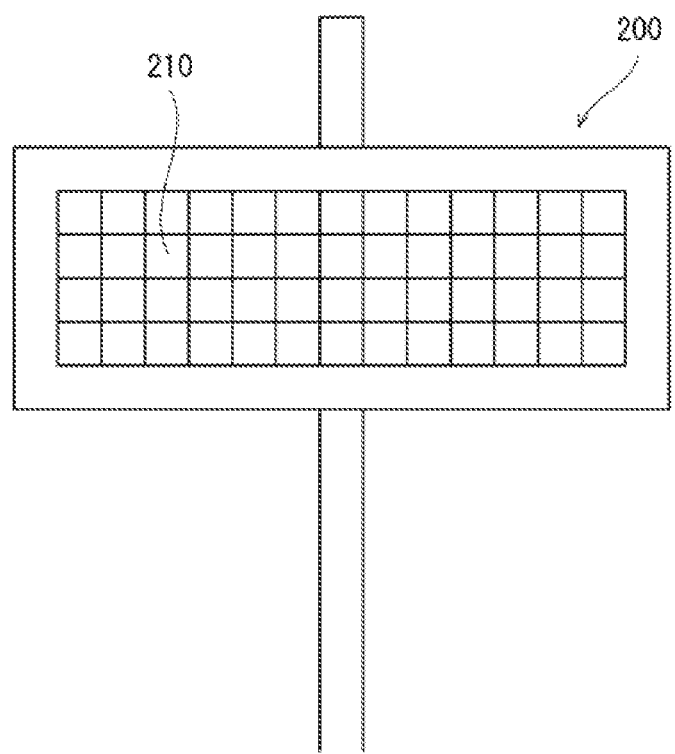
FIG. 5 is a diagram illustrating a front view of a light emitter in a liquid surface detecting apparatus, such as FIG. 1.

FIG. 5 illustrates a front view of the light emitter 200. As illustrated in FIG. 5, the light emitter 200 is provided with multiple LEDs 210 in the height direction and the width direction.

Figure 6:
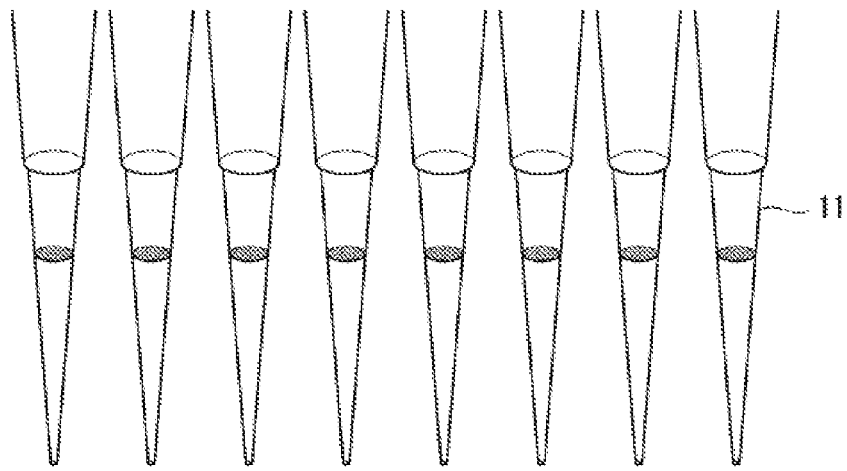
FIG. 6 is a configurational diagram illustrating the liquid surfaces of the liquid inside pipettes, whose image is captured by a camera in a liquid surface detecting apparatus, such as in FIG. 1.

FIG. 6 illustrates a configurational diagram for explaining an image captured by the camera 300. FIG. 6 illustrates the liquid surfaces of the liquid inside the pipettes 11.

As illustrated in FIG. 6, an image of the liquid surfaces is captured when the light emitted by the light emitter 200 is reflected by the liquid surfaces of the liquid retained in the pipettes 11 to directly enter the camera 300. Thus, in the captured image, an image of the liquid surfaces is captured due to the entrance of intense light. Hence, in the captured image, only the areas of the liquid surfaces are displayed as areas with higher luminance than other areas.

As described above, when the camera 300 captures an image while the light reflected at the levels of the liquid surfaces is directly entering the camera 300, it is possible to detect the levels of the liquid surfaces of the liquid using the captured image. Since the intense light reflected by the liquid surfaces directly enters the camera 300 and an image thereof is captured, only the areas of the image of the liquid surfaces are displayed with a higher luminance than the surroundings. Thus, it is possible to reliably detect the levels of the liquid surfaces. In the present embodiment, using the captured image, the boundary area between the dark area and the high luminance area illuminated by direct light is detected as the area of the liquid surface. Specifically, the area with a rapid change in brightness is determined as the area of the liquid surface using the captured image. In addition, here, bubble generation or the like may be detected in parallel based on the brightness of the captured image.

Since the levels of the liquid surfaces of the liquid inside the pipettes 11 are detected using the captured image, it is possible to detect whether or not the amount of liquid retained inside the pipettes 11 is appropriate from the levels of the liquid surface.

In addition, as illustrated in FIGS. 1 and 2A, the light shielding member 600 is provided on the opposite side of the pipettes 11 from the light emitter 200 and the camera 300. From the point of view of the camera 300, the light shielding member 600 is provided at a position behind the pipettes 11. Thus, it is possible to shield light, among the light emitted by the light emitter 200 toward the liquid inside the pipettes 11, which enters the camera 300 after being reflected at a position other than the liquid surface of the liquid.

For example, consider the case where part of the light emitted by the light emitter 200 is reflected by a member provided at a position near the pipettes 11 and enters the camera 300. An image of the light is captured by the camera 300 despite the fact that the reflected light is not reflected at the level of the liquid surface. Particularly in the case where metal is used on the periphery of the pipette 11 in the liquid surface detecting apparatus 1, it is conceivable that part of the light emitted from the light emitter 200 is reflected by the metal and the reflected light from the metal enters the camera 300. In such a case, if an image of the light reflected at a position other than the position of the liquid surface is captured by the camera 300, there is a possibility that reflected light from the position of the liquid surface cannot be clearly recognized. This may reduce the accuracy of detecting the level of the liquid surface.

The present embodiment provides the light shielding member 600 at a position behind the pipettes 11 in order to reduce noise on the image captured by the camera 300 to a lower level. Since the light shielding member 600 shields the light reflected at a position other than the liquid surfaces of the liquid and enters the camera 300, only the image of the liquid surfaces is clearly displayed on the image taken by the camera 300. Thus, it is possible to reliably recognize the levels of the liquid surfaces. This makes it possible to retain high the accuracy of detecting the levels of the liquid surfaces.

In addition, in the present embodiment, the light shielding member 600 is colored in black. For this reason, if the light emitted by the light emitter 200 is red, for example, the light emitted by the light emitter 200 and reflected by the liquid surfaces is clearly recognized by using the black light shielding member 600 as a background. As described above, the present embodiment makes it possible to allow the light shielding member 600 to function as a screen for clearly displaying the light emitted by the light emitter 200 and reflected by the liquid surfaces on the image.

In addition, the light emitter 200 includes the multiple LEDs 210. In the present embodiment, the light emitter 200 includes the multiple LEDs 210 both in the height direction and the width direction.

In the present embodiment, multiple pipettes 11 are arranged, and the camera 300 is configured such that it can capture an image of the volumes of liquid retained in the multiple pipettes 11 at one time. The light emitter 200 has the multiple LEDs 210 in the direction of arrangement of the volumes of liquid when the camera 300 captures an image of the volumes of liquid inside the arranged pipettes 11.

Since the light emitter 200 has the multiple LEDs 210 in the direction of arrangement of the volumes of liquid (width direction), it is possible to make uniform the intensity of the reflected light which is emitted by the light emitter 200, which is reflected by the liquid surfaces inside the pipettes 11, and which enters the camera 300 with respect to the direction of arrangement of the volumes of liquid. Therefore, it is possible to reduce an error in detecting the levels of the liquid surfaces to a lower level.

Suppose that the number of LEDs 210 of the light emitter 200 is one or an extremely small number. Then, it is conceivable that the intensity of the reflected light differs with respect to the direction of arrangement of the volumes of liquid depending on the positions of the pipettes 11 provided. For example, it is conceivable that intense reflected light enters the camera 300 from the pipettes 11 provided at positions near the LEDs 210 and weak reflected light enters the camera 300 from the pipettes 11 provided at positions away from the LEDs 210. In such a case, since the intensity of the reflected light is not uniform, there is a possibility that an error may occur in the detection positions of the liquid surfaces to be recognized. Thus, there is a possibility of reduction of the detection accuracy of the levels of the liquid surfaces.

In order to accurately detect the levels of the liquid surfaces, it is desirable that the reflected light which is reflected at the levels of the liquid surfaces and which enters the camera 300 do not differ depending on the positions of the pipettes 11 provided, remaining uniform. Therefore, the light emitter 200 desirably has multiple LEDs 210 depending on the number of liquids provided.

A description is provided for the detection of whether or not the amount of liquid retained inside the pipettes 11 is appropriate.

Figure 7:
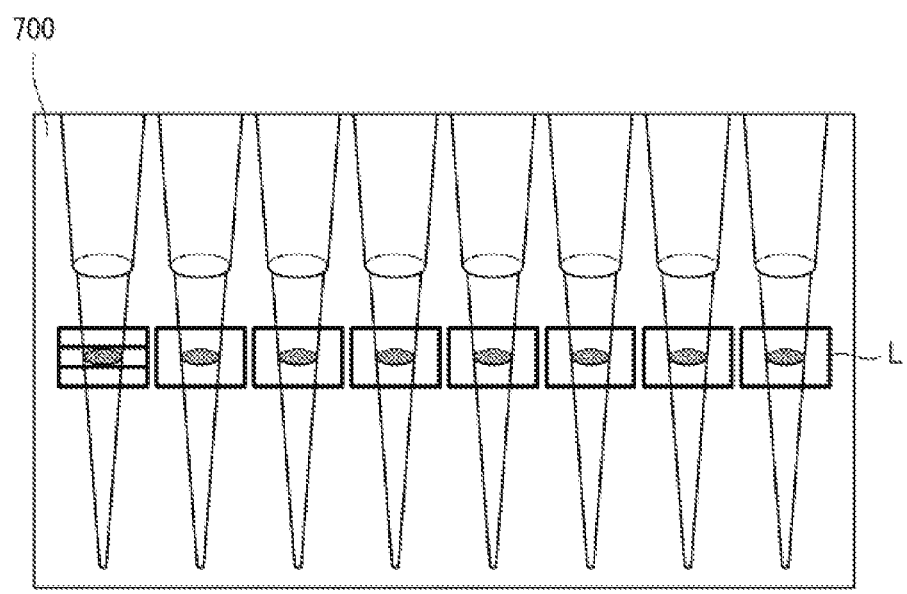
FIG. 7 is a configurational diagram illustrating an image of the liquid surfaces of the liquid inside pipettes captured by a camera in a liquid surface detecting apparatus, such as in FIG. 1, depicting a state where it is being detected whether or not the liquid surfaces are at appropriate levels.

FIG. 7 is an image for detecting whether or not the amount of liquid retained inside the pipettes 11 is appropriate based on the levels of the liquid surfaces detected. FIG. 7 illustrates a configurational diagram of the image captured by the camera 300 for the liquid surfaces of the liquid inside the pipettes 11. In the present embodiment, the image is displayed by the output section 700 as a display. FIG. 7 illustrates a configurational diagram of an image subjected to image processing of adjusting the contrast and the like of the captured image, the image being displayed such that only the areas of the liquid surfaces have a high luminance. This makes it possible to display an image, having the areas of the liquid surfaces as the only bright areas displayed, on the output section 700.

It is possible to know the levels of the liquid surfaces based on this image. Thus, detection of whether or not the liquid surfaces are within the predetermined range makes it possible to detect whether or not the amount of liquid retained inside the pipettes 11 is appropriate.

FIG. 7 illustrates reference lines L as a reference for detecting whether or not each of the liquid surfaces is within a region of the predetermined range. Each of the reference lines L forms a reference rectangle for the corresponding pipette 11. It is determined that the liquid surface of liquid in a pipette 11 is at an appropriate level if that liquid surface, detected in the detection of liquid surfaces performed by image capturing, is within the region inside the rectangle formed by the reference line L set for that pipette 11. Specifically, it is determined that the amount of liquid retained in the retaining section 17 of the pipette 11 is appropriate, and it is determined that an appropriate amount of sample is retained in the retaining section 17 of the pipette 11.

Suppose that the liquid surface is located at a level below the rectangle formed by the reference line L. Then, it is determined that the liquid surface is below the case of an appropriate amount and determined that the amount of liquid retained inside the pipette 11 is insufficient. On the other hand, suppose that the liquid surface is located at a level above the rectangle formed by the reference line L. Then, it is determined that the liquid surface is above the case of an appropriate amount and determined that the amount of liquid retained inside the pipette 11 is excessive.

With reference to FIGS. 8A to 9, a description is provided for the operation in which the pipette 11 aspirates liquid, it is detected whether or not the amount of liquid is appropriate, and the liquid aspirated by the pipette 11 is injected into wells 510b of a microplate 500b if the amount is appropriate.

FIGS. 8A to 8F illustrate configurational diagrams for the steps of the operation starting from the aspiration of liquid by the pipette 11 and ending at the injection of liquid into the wells 510*b* of the microplate 500*b*. In addition, FIG. 9 illustrates a flowchart for the control flow of the operation starting from the aspiration of liquid by the pipette 11 and ending at the injection of liquid into the wells 510*b* of the microplate 500*b*.

In the present embodiment, the liquid is stored only in a microplate 500*a* (storing section) on one hand and the liquid is not stored in the microplate 500*b* on the other hand before the liquid is injected into the wells 510*b* of the microplate 500*b*. The liquid is retained inside wells 510*a* of the microplate 500*a*, which is one of the two microplates 500 provided on the table 400 provided at a position near the main body section 100. In addition, nothing is retained in the wells 510*b* of the microplate 500*b*, which is one of the two microplates 500 provided at a position away from the main body section 100. Therefore, the microplate 500*b* is empty.

First, an arm 110 of the main body section 100 is moved to bring the pipettes 11 close to the microplate 500*a* among the microplates 500, which is provided at a position near the main body section 100. This brings the opening portions 19 of the distal ends of the pipettes 11 close to the wells 510*a* for aspiration in the microplate 500*a*. In this way, the pipettes 11 are moved toward the liquid storing section (S1).

After the pipettes 11 are moved and the opening portions 19 of the pipettes 11 arrive at a position above the wells 510*a* for aspiration in the microplate 500*a*, the pipettes 11 are moved such that the pipettes 11 descend from that position. Thus, the opening portions 19 of the pipettes 11 are located inside the wells 510*a* for aspiration in the microplate 500*a*, as illustrated in FIG. 8B.

When the opening portions 19 of the pipettes 11 are located inside the wells 510*a* for aspiration, the pin 13 is moved up such that the pin 13 returns from the pressed position to the original position. This forms a negative pressure in the retaining section 17 of each pipette 11, aspirating the liquid from the well 510*a* via the opening portion 19 into the retaining section 17.

Here, the pin 13 is moved up by driving the shaft 16*a* of the motor 16 of the hand section 10 in the direction D3 to move the lever 15 in the direction D2 via the gear 18*a* and the gear 18*b* (FIGS. 2A and 2B). When the pin 13 is moved up, a negative pressure is generated in the retaining section 17 inside the pipette 11. The pipette 11 can aspirate the liquid inside the well 510*a* if a negative pressure is generated inside the pipette 11 while the opening portion 19 of the pipette 11 is located below the liquid surface of the liquid stored inside the well 510*a* and thus the opening portion 19 of the pipette 11 is in the liquid.

Thus, the liquid stored inside the well 510*a* for aspiration is aspirated into the pipette 11 via the opening portion 19, and the liquid is aspirated by the pipette 11 (aspiration step). In this way, the liquid is retained inside the retaining section 17 of the pipette 11 (S2).

When the liquid is retained inside the pipettes 11, it is detected whether or not the amount of liquid retained inside the pipettes 11 is appropriate.

Before it is detected whether or not the amount of liquid retained inside the pipettes 11 is appropriate, the arm 110 is moved to move the pipettes 11 to a position for detecting the levels of the liquid surfaces of the liquid (S3). Specifically, the pipettes 11 are moved to a position such that, in a state where the liquid surfaces are at appropriate levels, light emitted from the light emitter 200 is reflected by the liquid surfaces of the liquid and directly enters the camera 300.

After the pipettes 11 are moved to a position for detecting the levels of the liquid surfaces of the liquid, the light emitter 200 emits light (light emitting step) and the camera 300 captures an image of the levels of the liquid surfaces of the liquid (image capturing step), as illustrated in FIG. 8C. In the detection of the levels of the liquid surfaces of the liquid, light is emitted by the light emitter 200 toward the positions of the liquid surfaces of the liquid and the light reflected by the liquid surfaces of the liquid is allowed to directly enter the camera 300 (S4). Additionally, the camera 300 captures an image while the light emitted by the light emitter 200 is reflected by the liquid surfaces and the reflected light is directly entering the camera 300 (S5). As a result, the intense light from the liquid surfaces enters the camera 300, and the areas of the liquid surfaces are intensely displayed on the image by the image capturing of the camera 300. This allows accurate detection of the levels of the liquid surfaces of the liquid (detection step) (S6).

In the present embodiment, the levels of the liquid surfaces of the liquid are detected by the liquid surface level detection section 23 of the liquid surface detection controller 20. The liquid surface level detection section 23 detects the levels of the liquid surfaces of the liquid based on the image which is obtained by the image capturing of the camera 300 and for which image processing has been performed by the image processing section 22. Here, the liquid surface level detection section 23 functions as a detecting device which detects the levels of the liquid surfaces of the liquid retained in the retaining sections 17 of the pipettes 11.

After the detection of the levels of the liquid surfaces of the liquid retained in the retaining sections 17 of the pipettes 11, it is determined whether or not the amount of liquid retained in the retaining sections 17 is appropriate based on the levels of the liquid surfaces detected (S7).

In the present embodiment, the liquid amount appropriateness determination section 24 of the liquid surface detection controller 20 determines whether or not the amount of liquid is appropriate based on the levels of the liquid surfaces of the liquid detected. Thus, the liquid amount appropriateness determination section 24 functions as a determination device which determines whether or not the amount of liquid is appropriate. After the liquid amount appropriateness determination section 24 determines whether or not the amount of liquid is appropriate, the output section 700 is allowed to output the results of the determination. In the present embodiment, the output controller 26 of the liquid surface detection controller 20 controls the outputting by the section 700.

If it is detected that the amount of liquid is appropriate as a result of detecting whether or not the amount of liquid retained in the retaining sections 17 of the pipettes 11, the liquid retained inside the pipettes 11 is injected into the microplate 500*b* on the other hand. Specifically, the liquid, aspirated and retained by the pipettes 11 from the microplate 500*a* provided at a position near the main body section 100, is injected into the microplate 500*b* provided at a position away from the main body section 100.

If it is detected that the amount of liquid retained in the retaining sections 17 of the pipettes 11 is inappropriate, the liquid inside the pipettes 11 is ejected and the flow returns to S2. Again, the liquid is aspirated by the pipettes 11 and it is detected whether or not the amount of liquid is appropriate, for example. In this way, the liquid is repeatedly aspirated by the pipettes 11 and it is repeatedly detected whether or not the amount of liquid is appropriate until it is detected that the amount of liquid retained inside the pipettes 11 is appropriate.

In the case of injecting the liquid retained inside the pipettes 11 into the microplate 500b on the other hand after the detection that the amount of liquid is appropriate, the arm 110 is moved and the pipettes 11 are moved so as to bring the opening portions 19 close to the microplate 500b on the other hand, as illustrated in FIG. 8D.

After the pipettes 11 are moved and the opening portions 19 of the pipettes 11 arrive at a position above the wells 510b for injection in the microplate 500b, the pipettes 11 are moved such that the pipettes 11 descend from that position. Thus, the opening portions 19 of the pipettes 11 are located inside the wells 510b for injection in the microplate 500b, as illustrated in FIG. 8E.

When the opening portions 19 of the pipettes 11 are located inside the wells 510b for injection, the pin 13 is moved such that the pin 13 is pressed downward from the upper position. When the pin 13 is moved down, the liquid retained in the retaining sections 17 of the pipettes 11 is ejected to the wells 510b via the opening portions 19.

Here, the pin 13 is moved down by driving the shaft 16a of the motor 16 of the hand section 10 in the direction D4 to move the lever 15 in the direction D1 via the gear 18a and the gear 18b. When the pin 13 is moved down, the pressure inside the retaining sections 17 increases, which ejects the liquid retained in the retaining sections 17 of the pipettes 11 via the opening portions 19 because the liquid is pressed toward the opening portions 19. Consequently, the liquid retained inside the retaining sections 17 of the pipettes 11 is ejected via the opening portions 19 into the wells 510b for injection. This injects the liquid retained inside the retaining sections 17 of the pipettes 11 into the wells 510b of the microplate 500b (S8).

Here, an appropriate amount of liquid is injected into the wells 510b for injection because it has already been detected that the amount of liquid retained inside the retaining sections 17 of the pipettes 11 is appropriate. As a consequence, it is possible to inject an appropriate amount of liquid into the wells 510b for injection.

When the liquid is injected into the wells 510b for injection in one step, the liquid is aspirated from the wells 510a for aspiration in the following step and it is detected whether or not the amount of liquid retained in the pipettes 11 is appropriate. Then, the liquid is injected into the wells 510b for injection.

These steps are repeated until the liquid is aspirated for all wells 510a for aspiration and the liquid is injected for all wells 510b for injection.

It is determined whether or not the liquid is aspirated for all wells 510a for aspiration and the liquid is injected for all wells 510b for injection (S9). If it is determined that the liquid is aspirated for all wells 510a for aspiration and the liquid is injected for all wells 510b for injection, the pipettes 11 are moved in a direction away from the microplate 500 (S10).

This completes the control flow which starts when the pipettes 11 aspirate the liquid and which ends when the liquid is injected into the wells 510b of the microplate 500b.

As described above, the light reflected by the liquid surfaces of the liquid directly enters the camera 300 and an image thereof is captured by the camera 300 in the liquid surface detecting apparatus 1 of the present embodiment. Thus, the image of the liquid surfaces is captured on the entrance of intense light. The levels of the liquid surfaces are reliably detected because intense light directly enters the camera 300 and an image of the levels of the liquid surfaces is captured. In addition, since an image with a high luminance displays the areas of the liquid surfaces, it is possible to easily find the areas of the liquid surfaces.

Hence, it is possible to reliably detect the levels of the liquid surfaces of the liquid even when the color of the liquid surfaces of the liquid is similar to the color of the surroundings. For example, consider the case where the upper layer of the liquid is a clear layer or a transparent layer. Even in that case, the light reflected by the liquid surfaces directly enters the camera 300. Thus, the areas of the liquid surfaces are displayed by intense light. Therefore, it is possible to reliably display the liquid surfaces on the image after the image of the liquid surfaces are captured.

Since the liquid surfaces are reliably displayed, it is possible to reliably detect the levels of the liquid surfaces. Thus, it is possible to reliably detect whether or not the amount of liquid is appropriate based on the levels of the liquid surfaces detected. Therefore, it is possible to reliably inject an appropriate amount of liquid into the microplate 500b for injection and to more enhance the certainty of injecting liquid into the microplate 500b.

Moreover, in the present embodiment, the light emitter 200 and the camera 300 are provided on the same side of the retaining sections 17 of the pipettes 11. The light emitter 200 and the camera 300 are provided on the same side of the retaining sections 17 of the pipettes 11, which means that relatively large elements, the light emitter 200 and the camera 300, are collectively provided on at positions on the same side of the retaining sections 17. This therefore allows efficient use of the space in the liquid surface detecting apparatus 1, making it possible to downsize the liquid surface detecting apparatus 1.

Furthermore, as illustrated in FIG. 4B, light emitted from the light emitter 200 is reflected by the curved surface of the liquid surface if the light emitter 200 and the camera 300 are in a positional relationship such that they are provided on the same side of the retaining sections 17 of the pipettes 11 and the light is reflected by the curved portion. Hence, this allows freedom of the levels of the liquid surfaces of liquid. Since the light is reflected by the curved portion of the liquid surface of liquid, part of the light emitted from the light emitter 200 is reflected somewhere and directly enters the camera 300. Therefore, it is possible to allow the light reflected by the liquid surface to directly enter the camera 300 even when the liquid surface of liquid is moved up and down to some extent.

In addition, the light reflected by the curved portion of the liquid surface directly enters the camera 300 even when the positional relationship between the light emitter 200 and the camera 300 is changed because the light is reflected by the curved surface. This eliminates the need for high accuracy in the arrangement positions of the light emitter 200 and the camera 300. Therefore, it is possible to reduce the manufacturing cost of the liquid surface detecting apparatus 1 to a low level.

Additionally, in the present embodiment, the pipettes 11 are gripped by the hand section of the main body section 100. This means that the retaining sections 17 of the pipettes 11 are included in the hand section of the main body section 100. Since the pipettes 11 are included in the hand section of the robot, it is possible to move with a high accuracy the pipettes 11 to a position for detecting the levels of the liquid surfaces when the pipettes 11 are to be moved to that position for the purpose of detecting the levels of the liquid surfaces of liquid. Since the pipettes 11 can be moved accurately to a position for detecting the levels of the liquid surfaces, it is possible to reliably detect the levels of the liquid surfaces of liquid.

In the present embodiment, the liquid surface detection controller 20 detects the liquid surfaces inside the pipettes 11 and determines whether or not the amount of liquid inside the pipettes 11 is appropriate. For example, a PC provided separately from the main body section 100 may play the role of the liquid surface detection controller 20. In that case, the CPU installed in the PC may function as the liquid surface detection controller 20. In this way, the liquid surface detection controller 20 inside the PC may detect the liquid surfaces inside the pipettes 11 and determine whether or not the amount of liquid inside the pipettes 11 is appropriate.

Besides, the robot controller 14 may be configured such that it has the functions as the liquid surface detection controller 20. The robot controller 14 may include the liquid surface detection controller 20 to detect the liquid surfaces inside the pipettes 11 and determine whether or not the amount of liquid inside the pipettes 11 is appropriate.

The liquid surface detection controller 20 and the robot controller 14 may be the same controller or may be different controllers.

In the embodiment above, a description has been provided for an embodiment which employs the microplate 500a as a storing section having liquid pre-stored therein and which employs the microplate 500b as an injection section for injection. However, other container may be employed as long as it can retain liquid, and no limitation is imposed on microplates as a storing section having liquid stored therein and an injection section for injection.

In the embodiment above, a description has been provided for an embodiment in which the light emitter 200 emits red light. However, the disclosure is not limited to the embodiment described above. The light emitter may emit light having a color different from red. For example, white light may be emitted.

In the embodiment above, a description has been provided for an embodiment in which the light shielding member 600 is black. However, the disclosure is not limited to the embodiment described above. The light shielding member 600 may have a color other than black as long as it is possible to clearly recognize the light from the light emitter 200 on the image. In that case, it is desirable that the combination of colors be such that the color of the light emitted from the light emitter 200 is in contrast with the color of the light shielding member 600 so that the light from the light emitter 200 can be recognized clearly.

In the embodiment above, a description has been provided for an embodiment in which the camera 300 is used as an image capturing device. However, the disclosure is not limited to the embodiment described above. The image capturing device may be any device other than a camera for merely capturing an image and any type of image capturing device as long as it can detect the levels of the liquid surfaces of liquid.

The invention claimed is:

1. A liquid surface detecting apparatus comprising:
    an aspirator configured to aspirate a liquid through a pipette, the liquid comprising a sample or reagent;
    a light emitter that emits light toward the liquid in the pipette
    an image capturing device that captures an image of the liquid in the pipette; and
    a detecting device that detects a level of a liquid surface of the liquid in the pipette based on the image of the liquid captured by the image capturing device.

2. The liquid surface detecting apparatus according to claim 1, wherein
    the image capturing device is provided on an optical axis of the light emitted by the light emitter and specularly reflected by the liquid surface of the liquid.

3. The liquid surface detecting apparatus according to claim 1, further comprising:
    a determination device that determines whether or not an appropriate amount of liquid is retained in the pipette based on the level of the liquid surface of the liquid detected by the detecting device.

4. The liquid surface detecting apparatus according to claim 1, wherein
    the light emitter and the image capturing device are provided on the same side with respect to the pipette.

5. The liquid surface detecting apparatus according to claim 4, wherein
    the image capturing device is provided at a position such that the light, emitted by the light emitter and reflected by a curved portion of the liquid surface of the liquid, directly enters the image capturing device.

6. The liquid surface detecting apparatus according to claim 4, further comprising:
    a light shielding member that is provided on an opposite side with respect to the pipette from the light emitter and the image capturing device and that shields light, among the light emitted by the light emitter toward the liquid, which enters the image capturing device after being reflected at a position other than the liquid surface of the liquid.

7. The liquid surface detecting apparatus according to claim 1, wherein
    the image capturing device is capable of capturing an image of volumes of liquid retained in the retained sections at one time, and
    the light emitter includes light emitting elements in a direction of arrangement of the volumes of liquid when the image capturing device captures the image of the volumes of liquid.

8. The liquid surface detecting apparatus according to claim 1, further comprising:
    a storing section with the liquid stored therein.

9. The liquid surface detecting apparatus according to claim 1, wherein
    the pipette is included in a hand section of a robot.

10. A method of detecting a liquid surface, comprising:
    aspirating a liquid through a pipette, the liquid comprising a sample or reagent;
    emitting light toward the liquid in the pipette;
    capturing an image of the liquid at a position such that the light, emitted in the light emission and reflected by a liquid surface of the liquid, directly enters the image capturing device; and
    detecting a level of the liquid surface of the liquid based on the image of the liquid captured in the image capturing.

* * * * *